US012621087B2

(12) United States Patent
Wang et al.

(10) Patent No.: US 12,621,087 B2
(45) Date of Patent: May 5, 2026

(54) METHOD, DEVICE AND COMPUTER STORAGE MEDIUM OF COMMUNICATION

(71) Applicant: NEC CORPORATION, Tokyo (JP)

(72) Inventors: Gang Wang, Beijing (CN); Yukai Gao, Beijing (CN)

(73) Assignee: NEC CORPORATION, Tokyo (JP)

( * ) Notice: Subject to any disclaimer, the term of this patent is extended or adjusted under 35 U.S.C. 154(b) by 283 days.

(21) Appl. No.: 18/268,716

(22) PCT Filed: Dec. 21, 2020

(86) PCT No.: PCT/CN2020/138053

§ 371 (c)(1),
(2) Date: Jun. 21, 2023

(87) PCT Pub. No.: WO2022/133658

PCT Pub. Date: Jun. 30, 2022

(65) Prior Publication Data

US 2024/0048292 A1 Feb. 8, 2024

(51) Int. Cl.
*H04L 1/1829* (2023.01)

(52) U.S. Cl.
CPC .................................. *H04L 1/1854* (2013.01)

(58) Field of Classification Search
CPC ...................................................... H04L 1/1854
See application file for complete search history.

(56) References Cited

U.S. PATENT DOCUMENTS

| | | | |
|---|---|---|---|
| 2020/0358562 A1 | 11/2020 | Peng et al. | |
| 2021/0306107 A1* | 9/2021 | Yin ........................ | H04L 1/1896 |
| 2022/0399960 A1* | 12/2022 | Bae ................... | H04W 72/1273 |
| 2023/0155720 A1* | 5/2023 | Yin ........................ | H04L 1/0013 |
| | | | 370/329 |

FOREIGN PATENT DOCUMENTS

| | | |
|---|---|---|
| CN | 110034866 A | 7/2019 |
| CN | 110708146 A | 1/2020 |
| CN | 111314040 A | 6/2020 |
| JP | 2021511744 A | 5/2021 |
| WO | 2020144833 A1 | 7/2020 |

OTHER PUBLICATIONS

International Search Report for PCT/CN2020/138053, dated Sep. 24, 2021.
Written Opinion for PCT/CN2020/138053, dated Sep. 24, 2021.
Communication dated Oct. 15, 2024 issued by the Japanese Patent Office in application No. 2023-537977.

* cited by examiner

*Primary Examiner* — Mansour Oveissi
(74) *Attorney, Agent, or Firm* — Sughrue Mion, PLLC

(57) ABSTRACT

Embodiments of the present disclosure relate to methods, devices and computer readable media for communication. A terminal device receives, from a network device, a first timing value set associated with a first HARQ feedback with a first priority, a second timing value set associated with a second HARQ feedback with a second priority different from the first priority, and a TDRA list for the first and second HARQ feedbacks, determines a third timing value set from the first and second timing value sets, constructs a HARQ codebook comprising the first and second HARQ feedbacks at least based on the third timing value set and the TDRA list, and transmits the HARQ codebook to the network device on an uplink control channel. In this way, unnecessary redundancy in HARQ bits can be removed and UCI overhead can be reduced.

15 Claims, 8 Drawing Sheets

100

120

110

200 ⟍

300A ⟍

300B ⟍

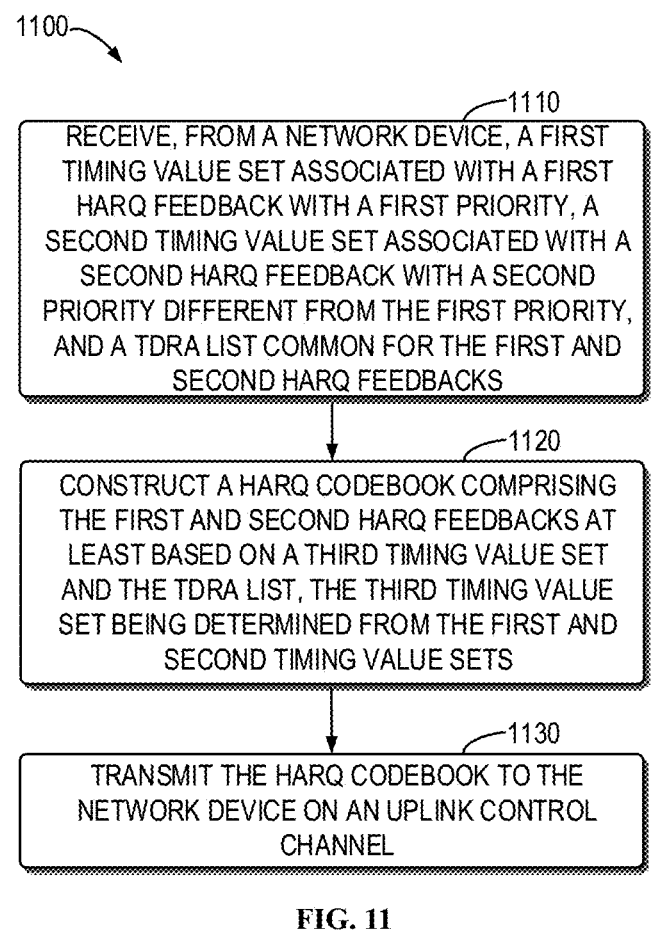

1100

1110

RECEIVE, FROM A NETWORK DEVICE, A FIRST TIMING VALUE SET ASSOCIATED WITH A FIRST HARQ FEEDBACK WITH A FIRST PRIORITY, A SECOND TIMING VALUE SET ASSOCIATED WITH A SECOND HARQ FEEDBACK WITH A SECOND PRIORITY DIFFERENT FROM THE FIRST PRIORITY, AND A TDRA LIST COMMON FOR THE FIRST AND SECOND HARQ FEEDBACKS

1120

CONSTRUCT A HARQ CODEBOOK COMPRISING THE FIRST AND SECOND HARQ FEEDBACKS AT LEAST BASED ON A THIRD TIMING VALUE SET AND THE TDRA LIST, THE THIRD TIMING VALUE SET BEING DETERMINED FROM THE FIRST AND SECOND TIMING VALUE SETS

1130

TRANSMIT THE HARQ CODEBOOK TO THE NETWORK DEVICE ON AN UPLINK CONTROL CHANNEL

FIG. 11

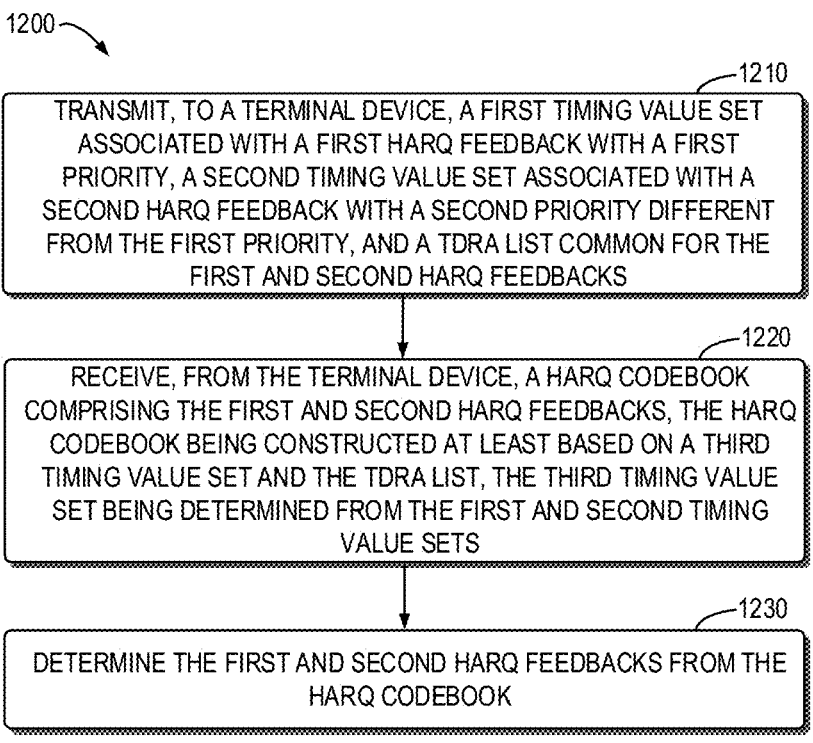

1200

1210

TRANSMIT, TO A TERMINAL DEVICE, A FIRST TIMING VALUE SET ASSOCIATED WITH A FIRST HARQ FEEDBACK WITH A FIRST PRIORITY, A SECOND TIMING VALUE SET ASSOCIATED WITH A SECOND HARQ FEEDBACK WITH A SECOND PRIORITY DIFFERENT FROM THE FIRST PRIORITY, AND A TDRA LIST COMMON FOR THE FIRST AND SECOND HARQ FEEDBACKS

1220

RECEIVE, FROM THE TERMINAL DEVICE, A HARQ CODEBOOK COMPRISING THE FIRST AND SECOND HARQ FEEDBACKS, THE HARQ CODEBOOK BEING CONSTRUCTED AT LEAST BASED ON A THIRD TIMING VALUE SET AND THE TDRA LIST, THE THIRD TIMING VALUE SET BEING DETERMINED FROM THE FIRST AND SECOND TIMING VALUE SETS

1230

DETERMINE THE FIRST AND SECOND HARQ FEEDBACKS FROM THE HARQ CODEBOOK

FIG. 12

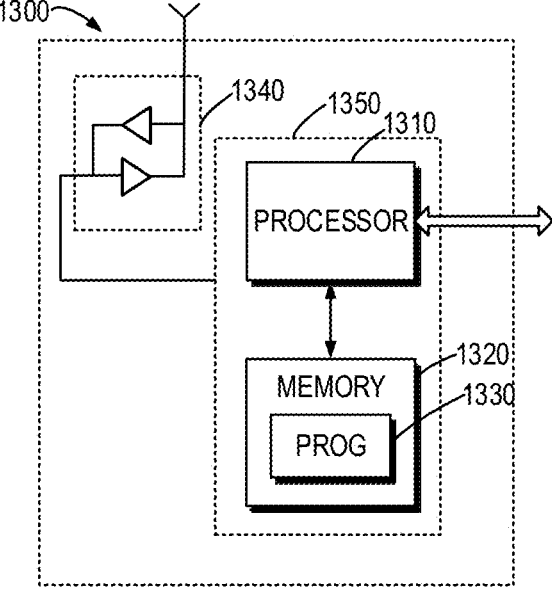

1300

1340

1350  1310

PROCESSOR

1320

MEMORY

1330

PROG

FIG. 13

METHOD, DEVICE AND COMPUTER STORAGE MEDIUM OF COMMUNICATION

CROSS REFERENCE TO RELATED APPLICATION

This application is a National Stage of International Application No. PCT/CN2020/138053 filed Dec. 21, 2020.

TECHNICAL FIELD

Embodiments of the present disclosure generally relate to the field of telecommunication, and in particular, to methods, devices and computer storage media of communication for multiplexing hybrid automatic repeat request (HARQ) feedbacks of different priorities on an uplink control channel.

BACKGROUND

Typically, for a user equipment (UE) with different services such as enhanced mobile broadband (eMBB) and ultra-reliable and low latency communication (URLLC), two physical uplink control channel (PUCCH) transmissions carrying hybrid automatic repeat request (HARQ) feedback for different services may be overlapped in time domain.

In new radio (NR) Release 16, for a UE, two HARQ-acknowledgement (HARQ-ACK) codebooks are simultaneously constructed for different services with different priorities. Separate PUCCH related parameters are configured for HARQ-ACK with different priorities to construct respective HARQ-ACK codebooks, e.g., HARQ-ACK feedback timing set K1, PUCCH configuration, HARQ-ACK codebook type, and granularity of HARQ-ACK feedback and so on. If two PUCCH transmissions corresponding to the two HARQ-ACK codebooks are overlapped in time domain, the UE only transmits one of the PUCCH transmissions for HARQ-ACK that has a higher priority and drops the other of the PUCCH transmissions for HARQ-ACK that has a lower priority. The dropping of the PUCCH transmission for HARQ-ACK with the lower priority ensures low latency and high reliability requirements of the PUCCH transmission for HARQ-ACK with the higher priority. However, performance of a service associated with the PUCCH transmission with the lower priority will be degraded.

SUMMARY

In general, embodiments of the present disclosure provide methods, devices and computer storage media for communication for multiplexing HARQ feedbacks of different priorities on an uplink control channel.

In a first aspect, there is provided a method of communication. The method comprises: receiving, at a terminal device and from a network device, a first timing value set associated with a first HARQ feedback with a first priority, a second timing value set associated with a second HARQ feedback with a second priority different from the first priority, and a time domain resource allocation (TDRA) list for a first HARQ feedback and a second HARQ feedback; constructing a HARQ codebook comprising the first and second HARQ feedbacks at least based on a third timing value set and the TDRA list, the third timing value set being determined from the first and second timing value sets; and transmitting the HARQ codebook to a network device on an uplink control channel.

In a second aspect, there is provided a method of communication. The method comprises: transmitting, at a network device and to a terminal device, a first timing value set associated with a first HARQ feedback with a first priority, a second timing value set associated with a second HARQ feedback with a second priority different from the first priority, and a TDRA list for a first HARQ feedback and a second HARQ feedback; receiving, from the terminal device, a HARQ codebook comprising the first and second HARQ feedbacks, the HARQ codebook being constructed at least based on a third timing value set and the TDRA list, the third timing value set being determined from the first and second timing value sets; and determining the first and second HARQ feedbacks from the HARQ codebook.

In a third aspect, there is provided a terminal device. The terminal device comprises a processor and a memory coupled to the processor. The memory stores instructions that when executed by the processor, cause the terminal device to perform the method according to the first aspect of the present disclosure.

In a fourth aspect, there is provided a network device. The network device comprises a processor and a memory coupled to the processor. The memory stores instructions that when executed by the processor, cause the network device to perform the method according to the second aspect of the present disclosure.

In a fifth aspect, there is provided a computer readable medium having instructions stored thereon. The instructions, when executed on at least one processor, cause the at least one processor to perform the method according to the first aspect of the present disclosure.

In a sixth aspect, there is provided a computer readable medium having instructions stored thereon. The instructions, when executed on at least one processor, cause the at least one processor to perform the method according to the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 11 illustrates an example method of communication implemented at a terminal device in accordance with some embodiments of the present disclosure;

FIG. 12 illustrates another example method of communication implemented at a terminal device in accordance with some embodiments of the present disclosure; and FIG. 13 is a simplified block diagram of a device that is suitable for implementing embodiments of the present disclosure.

Throughout the drawings, the same or similar reference numerals represent the same or similar element.

DETAILED DESCRIPTION

Figure 1:
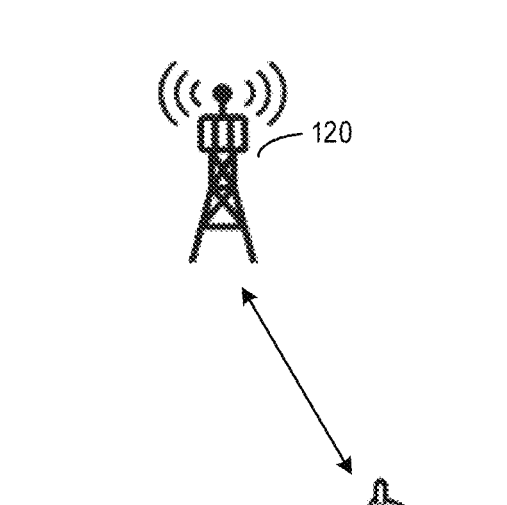
FIG. 1 illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device or the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As mentioned above, in Release 16 technology, the dropping of the PUCCH transmission for uplink control information (UCI) with the lower priority will degrade the performance of the service associated with the PUCCH transmission with the lower priority. NR Release 17 has approved intra-UE multiplexing/prioritization enhancements so as to improve the performance of the service having the lower priority. In this case, in case two PUCCH for HARQ feedbacks of different priorities are overlapped in time domain, it is highly concerned how to multiplex HARQ feedbacks of different priorities on one uplink control channel (e.g., PUCCH) so as to improve the performance of the service with the lower priority.

In view of this, embodiments of the present disclosure provide a solution for multiplexing HARQ feedbacks on one uplink control channel. In the solution, a HARQ codebook comprising the HARQ feedbacks and having no overlapped HARQ positions for the same slot is constructed and transmitted on the uplink control channel. In this way, HARQ feedback information in an uplink control channel transmission with a lower priority is remained without being dropped, and unnecessary redundancy in HARQ bits can be reduced.

Embodiments of the present disclosure may be applied to any suitable scenarios. For example, embodiments of the present disclosure may be implemented at URLLC. Alternatively, embodiments of the present disclosure can be implemented in one of the followings: reduced capability NR devices, NR multiple-input and multiple-output (MIMO), NR sidelink enhancements, NR systems with frequency above 52.6 GHz, an extending NR operation up to 71 GHz, narrow band-Internet of Thing (NB-IoT)/enhanced Machine Type Communication (eMTC) over non-terrestrial networks (NTN), NTN, UE power saving enhancements, NR coverage enhancement, NB-IoT and LTE-MTC, Integrated Access and Backhaul (IAB), NR Multicast and Broadcast Services, or enhancements on Multi-Radio Dual-Connectivity.

Principles and implementations of the present disclosure will be described in detail below with reference to the figures.

Example of Communication Network

FIG. 1 illustrates a schematic diagram of an example communication network 100 in which some embodiments of the present disclosure can be implemented. As shown in FIG. 1, the communication network 100 may include a terminal device 110 and a network device 120. In some embodiments, the terminal device 110 may be served by the network device 120. It is to be understood that the number of devices in FIG. 1 is given for the purpose of illustration without suggesting any limitations to the present disclosure. The communication network 100 may include any suitable number of network devices and/or terminal devices adapted for implementing implementations of the present disclosure.

As shown in FIG. 1, the terminal device 110 may communicate with the network device 120 via a channel such as a wireless communication channel. The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In some embodiments, the terminal device 110 may transmit uplink data information to the network device 120 via an uplink data channel transmission. For example, the uplink data channel transmission may be a physical uplink shared channel (PUSCH) transmission. Of course, any other suitable forms are also feasible.

In some embodiments, the terminal device 110 may transmit UCI, e.g., HACK feedback information to the network device 120 via an uplink control channel transmission. For example, the uplink control channel transmission may be a physical uplink control channel (PUCCH) transmission. Of course, any other suitable forms are also feasible.

In some embodiments, the network device 120 may support a plurality of services have different priorities for the terminal device 110, for example, eMBB with a lower priority and URLLC with a higher priority. Accordingly, the terminal device 110 may perform respective uplink data and/or control channel transmissions for the different services. The uplink control channel transmissions may carry HARQ feedbacks for different services and the HARQ feedbacks may have different priorities corresponding to different services.

Figure 2:
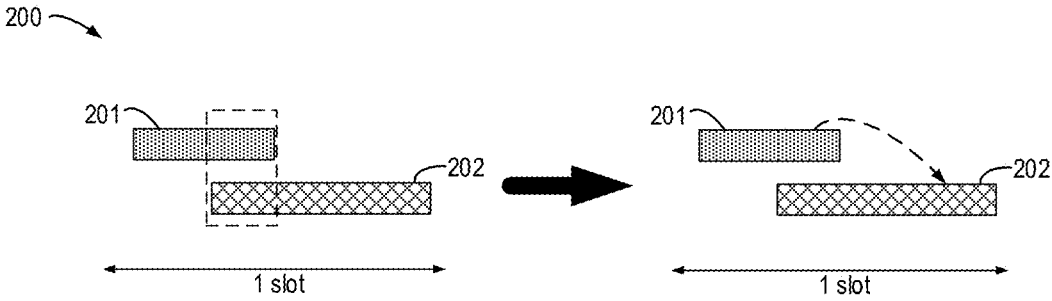
FIG. 2 illustrates a schematic diagram illustrating an example of an overlapping between two PUCCH carrying HARQ feedbacks with different priorities according to embodiments of the present disclosure.

In some scenarios, the terminal device 110 may have more than one uplink control channel transmission to be scheduled or configured in the same uplink slot or sub-slot. That is, these uplink control channel transmissions are overlapped or collided in time domain. FIG. 2 illustrates a schematic diagram 200 illustrating an example of an overlapping between two PUCCH carrying HARQ feedbacks for PDSCHs with different priorities according to embodiments of the present disclosure. In this example, a PUCCH 201 and a PUCCH 202 are scheduled in the same slot and thus overlapped in time domain, as shown by a dotted box in FIG. 2.

In this case, the terminal device 110 may resolve the overlapping or collision by multiplexing the HARQ feedback of the PUCCH 201 onto the PUCCH 202, as shown by a dotted arrow in FIG. 2. Of course, the terminal device 110 may also resolve the overlapping or collision by multiplexing the HARQ feedback of the PUCCH 202 onto the PUCCH 201. In either case, the terminal device 110 needs to multiplex the HARQ feedbacks of the PUCCHs 201 and 202 on one uplink control channel.

In one conventional solution for multiplexing the HARQ feedbacks, respective HARQ codebooks are generated for the HARQ feedbacks and are stitched together to construct a single HARQ codebook. A HARQ codebook type configured for the HARQ feedbacks may be Type-1 HARQ-ACK codebook or Type-2 HARQ-ACK codebook. According to conventional solutions, the Type-1 HARQ-ACK codebook may be determined based on the following factors: a HARQ-ACK timing value set K1 indicating a set of slot offsets of HARQ feedback with respect to corresponding PDSCH; a PDSCH TDRA list; a ratio $2^{(\mu_{DL}-\mu_{UL})}$ between a downlink (DL) subcarrier spacing (SCS) configuration $\mu_{DL}$ and an uplink (UL) SCS configuration $\rho_{UL}$ if different numerology between DL and UL is configured; and a time division duplexing (TDD) configuration by TDD-UL-DL-ConfigurationCommon and TDD-UL-DL-ConfigDedicated.

Figure 3A:
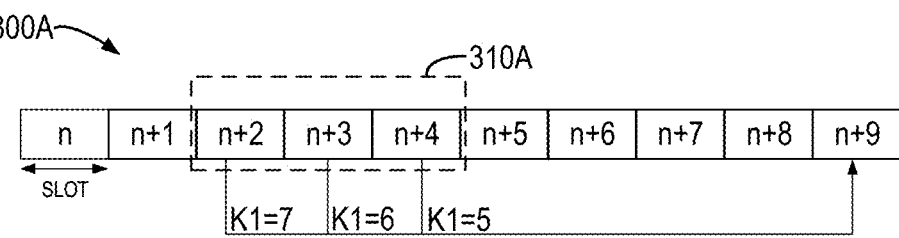
FIG. 3A illustrates a schematic diagram illustrating an example process for generating a slot based Type-1 HARQ codebook of one given priority according to conventional solutions.

FIG. 3A illustrates a schematic diagram illustrating an example process 300A for generating a slot based Type-1 HARQ codebook of one given priority according to conventional solutions. Assuming same numerology of DL and UL is configured in this example. As a first step, a HARQ-ACK window is determined based on the HARQ-ACK timing value set K1. The HARQ-ACK timing value k in the K1 set means the slot offset between the slot for PDSCH reception and the slot for PUCCH transmission. In this example, K1={5, 6, 7}. Assuming that slot n to n+3 and n+5 to n+8 are downlink slots for PDSCH and slots n+4 and n+9 are uplink slots, and slot n+9 is an uplink slot for HARQ feedback. Based on K1, a HARQ-ACK window 310A comprising slots n+2 to n+4 can be determined.

As a second step, for each slot associated with each value in K1, candidate PDSCH reception occasions in each slot are determined based on a TDRA list and TDD configuration. An example of the TDRA list is shown in Table 1.

TABLE 1

An example of a TDRA list for PDSCH

| Row Index | K0 | Start | Length | Mapping Type |
|---|---|---|---|---|
| 0 | 0 | #2 | 4 | B |
| 1 | 0 | #6 | 4 | B |
| 2 | 0 | #10 | 4 | B |
| 3 | 0 | #0 | 14 | A |
| 4 | 0 | #4 | 2 | B |
| 5 | 0 | #6 | 2 | B |
| 6 | 0 | #8 | 2 | B |
| 7 | 0 | #10 | 2 | B |
| 8 | 0 | #12 | 2 | B |

For convenience, the candidate PDSCH reception occasions in each slot are schematically shown in Table 2.

TABLE 2

An example of candidate PDSCH reception occasions

| 0 | 1 | 2 | 3 | 4 | 5 | 6 | 7 | 8 | 9 | 10 | 11 | 12 | 13 |
|---|---|---|---|---|---|---|---|---|---|---|---|---|---|
| | | RI0 | RI0 | RI0 | RI0 | RI1 | RI1 | RI1 | RI1 | RI2 | RI2 | RI2 | RI2 |
| RI3 | RI3 | RI3 | RI3 | RI3 | RI3 | RI3 | RI3 | RI3 | RI3 | RI3 | RI3 | RI3 | RI3 |
| | | | | RI4 | RI4 | RI5 | RI5 | RI6 | RI6 | RI7 | RI7 | RI8 | RI8 | where 0-13 denote symbol number, and candidate PDSCH reception occasions correspond to RI0 located in symbols 2-5, candidate PDSCH reception occasions correspond to RI1 located in symbols 6-9, candidate PDSCH reception occasions correspond to RI2 located in symbols 10-13, candidate PDSCH reception occasions correspond to RI3 located in symbols 0-13, candidate PDSCH reception occasions correspond to RI4 located in symbols 4-5, candidate PDSCH reception occasions correspond to RI5 located in symbols 6-7, candidate PDSCH reception occasions correspond to RI6 located in symbols 8-9, candidate PDSCH reception occasions correspond to RI7 located in symbols 10-11, candidate PDSCH reception occasions correspond to RI8 located in symbols 12-13.

The candidate PDSCH reception occasions in the TDRA list overlapped with UL configured by TDD-UL-DL-ConfigurationCommon and TDD-UL-DL-ConfigDedicated are excluded. For overlapped candidate PDSCH reception occasions, only one HARQ-ACK bit or position is generated based on a particular rule. As an example, for slot associated with K1=7 is DL slot, no candidate PDSCH reception occasions are excluded from the set of HARQ-ACK bits generation since no candidate PDSCH reception occasions are overlapped with UL. Then, five HARQ-ACK positions are occupied. That is, there are five HARQ-ACK bits in HARQ positions corresponding to K1=7 (i.e., slot n+2). For slot associated with K1=6, the last two symbols are UL symbol determined by TDD configuration, candidate PDSCH reception occasions corresponding to row index 2, 3 and 8 are excluded from the set of HARQ-ACK bits generation since these candidate PDSCH reception occasions are overlapped with UL. Then, four HARQ-ACK positions are occupied. That is, there are four HARQ-ACK bits in HARQ positions corresponding to K1=6 (i.e., slot n+3). For slot associated with K1=5 is UL slot, all candidate PDSCH reception occasions are excluded from the set of HARQ-ACK bits generation since all candidate PDSCH reception occasions are overlapped with UL. That is, there is no HARQ position corresponding to K1=5 (i.e., slot n+4). Thus, a HARQ codebook comprising nine HARQ positions is generated for a HARQ feedback.

Regarding the sub-slot based Type-1 HARQ-ACK codebook, which feedback granularity is sub-slot, e.g., the sub-slot is 7 symbols, the HARQ-ACK codebook construction rule is similar with slot based Type-1 codebook, which is achieved by replacing the slot unit by sub-slot unit and replacing the TDRA list by sub-TDRA list, the sub-TDRA list is obtained by divided the TDRA list into N sub-TDRA list, N is number of sub-slot within a slot. This will be described in connection with FIG. 3B.

Figure 3B:
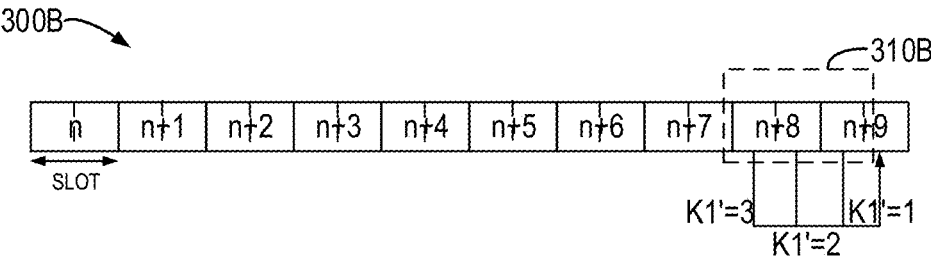
FIG. 3B illustrates a schematic diagram illustrating an example process for generating a sub-slot based Type-1 HARQ codebook of one given priority according to conventional solutions.

FIG. 3B illustrates a schematic diagram illustrating an example process 300B for generating a sub-slot based Type-1 HARQ codebook of one given priority according to conventional solutions. Assuming same numerology of DL and UL is configured in this example. As a first step, a HARQ-ACK window is determined based on the HARQ-ACK timing value set K1'. The HARQ-ACK timing value k in the K1' set means the sub-slot offset between the sub-slot for including the ending symbol of PDSCH reception and the sub-slot for PUCCH transmission. In this example, the sub-slot is 7-symbol, i.e., half-slot, and K1'={3, 2, 1}. Assuming that slot n to n+3 and n+5 to n+8 are downlink slots and slots n+4 and n+9 are uplink slots, and slot n+9 is an uplink slot for HARQ feedback. Based on K1', a HARQ-ACK window 310B comprising slot n+8 and half of slot n+9 can be determined.

As a second step, the TDRA list is divided into multiple sub lists based on K1' granularity. For example, the number of sub lists=floor/ceil {(slot duration)/(duration of K1 granularity)}. Which sub list the candidate PDSCH reception occasions in TDRA belong to can be determined based on an ending position of candidate PDSCH reception occasions. An example of the sub lists are shown in Tables 1A and 1B.

TABLE 1A

An example of sub list 1 for PDSCH

| Row Index | K0 | Start | Length | Mapping Type |
|---|---|---|---|---|
| 0 | 0 | #2 | 4 | B |
| 1 | 0 | #4 | 2 | B |

TABLE 1B

An example of sub list 2 for PDSCH

| Row Index | K0 | Start | Length | Mapping Type |
|---|---|---|---|---|
| 0 | 0 | #6 | 4 | B |
| 1 | 0 | #10 | 4 | B |
| 2 | 0 | #0 | 14 | A |
| 3 | 0 | #6 | 2 | B |
| 4 | 0 | #8 | 2 | B |
| 5 | 0 | #10 | 2 | B |
| 6 | 0 | #12 | 2 | B |

For convenience, the candidate PDSCH reception occasions in each slot are schematically shown in Tables 2A and 2B.

TABLE 2A

An example of candidate PDSCH reception occasions for sub list 1

| 0 | 1 | 2 | 3 | 4 | 5 | 6 | 7 | 8 | 9 | 10 | 11 | 12 | 13 |
|---|---|---|---|---|---|---|---|---|---|---|---|---|---|
| | | RI0 | RI0 | RI0 | RI0 | | | | | | | | |
| | | | | RI4 | RI4 | | | | | | | | | where 0-13 denote symbol number, and candidate PDSCH reception occasions correspond to RI0 located in symbols 2-5, candidate PDSCH reception occasions correspond to RI4 located in symbols 4-5.

TABLE 2B

An example of candidate PDSCH reception occasions for sub list 2

| 0 | 1 | 2 | 3 | 4 | 5 | 6 | 7 | 8 | 9 | 10 | 11 | 12 | 13 |
|---|---|---|---|---|---|---|---|---|---|----|----|----|----|
|  |  |  |  |  |  | RI1 | RI1 | RI1 | RI1 | RI2 | RI2 | RI2 | RI2 |
| RI3 | RI3 | RI3 | RI3 | RI3 | RI3 | RI3 | RI3 | RI3 | RI3 | RI3 | RI3 | RI3 | RI3 |
|  |  |  |  |  |  | RI5 | RI5 | RI6 | RI6 | RI7 | RI7 | RI8 | RI8 | where 0-13 denote symbol number, and candidate PDSCH reception occasions correspond to RI1 located in symbols 6-9, candidate PDSCH reception occasions correspond to RI2 located in symbols 10-13, candidate PDSCH reception occasions correspond to RI3 located in symbols 0-13, candidate PDSCH reception occasions correspond to RI5 located in symbols 6-7, candidate PDSCH reception occasions correspond to RI6 located in symbols 8-9, candidate PDSCH reception occasions correspond to RI7 located in symbols 10-11, candidate PDSCH reception occasions correspond to RI8 located in symbols 12-13.

The candidate PDSCH reception occasions in the TDRA list corresponding to the sub-slot overlapped with UL configured by TDD-UL-DL-ConfigurationCommon and TDD-UL-DL-ConfigDedicated are excluded. For overlapped candidate PDSCH reception occasions, only one HARQ-ACK bit or position is generated based on a particular rule. As an example, for sub-slot associated with K1'=3, no candidate PDSCH reception occasions in sub TDRA list 1 are excluded from the set of HARQ-ACK bits generation since no candidate PDSCH reception occasions are overlapped with UL. Then, one HARQ-ACK position is occupied. That is, there are one HARQ position corresponding to K1'=3 (i.e., half of slot n+8). For sub-slot associated with K1'=2, some candidate PDSCH reception occasions RI1, RI2 and RI6 in sub TDRA list 2 are excluded from the set of HARQ-ACK bits generation since these candidate PDSCH reception occasions are overlapped with UL. Then, three HARQ-ACK positions are occupied. That is, there are three HARQ positions corresponding to K1'=2 (i.e., half of slot n+8). As a sub-slot associated with K1'=1 is UL slot, all candidate PDSCH reception occasions are excluded from the set of HARQ-ACK bits generation since all candidate PDSCH reception occasions are overlapped with UL. That is, there is no HARQ position corresponding to K1'=1 (i.e., half of slot n+9). Thus, a HARQ codebook comprising four HARQ positions is generated for a HARQ feedback.

Figure 4:
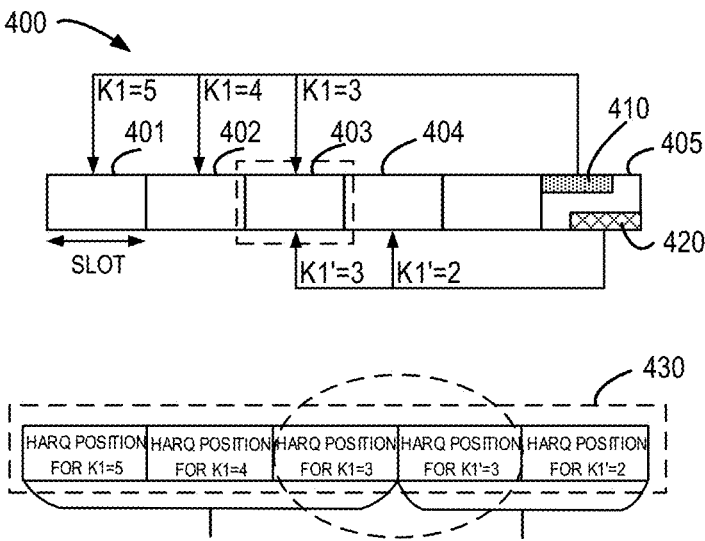
FIG. 4 illustrates a schematic diagram illustrating an example process for multiplexing HARQ codebooks with different priorities according to conventional solutions.

So far, the generation of a Type-1 HARQ codebook for a HARQ feedback is described. The following description is made on multiplexing of two HARQ codebooks according to conventional solutions. FIG. 4 illustrates a schematic diagram 400 illustrating an example process for multiplexing HARQ codebooks with different priorities according to conventional solutions. In this example, a UE is configured with two Type-1 HARQ-ACK codebooks for different services. The two HARQ-ACK codebooks are both slot-based codebooks. HARQ-ACK timing value set K1 for one HARQ-ACK codebook with a lower priority is {5, 4, 3}, and HARQ-ACK timing value set K1' for the other HARQ-ACK codebook with a higher priority is {3, 2}.

As shown in FIG. 4, PUCCH 410 with the lower priority and PUCCH 420 with the higher priority are overlapped in the same slot 405. Based on the set K1, a HARQ-ACK window comprising slots 401, 402 and 403 is determined for PUCCH 410, and a HARQ-ACK codebook 431 is accordingly determined for PUCCH 410. Based on the set K1', a HARQ-ACK window comprising slots 403 and 404 is determined for PUCCH 420, and a HARQ-ACK codebook 432 is accordingly determined for PUCCH 420. According to conventional solutions, a single codebook 430 is constructed by stitching the HARQ-ACK codebooks 431 and 432 together.

It can be seen that both the HARQ-ACK codebooks 431 and 432 are repeated for the slot 403, and there are two same set of HARQ positions for the slot 403 (i.e., for K1=3 and K1'=3) in the single codebook 430. For example, if 5 HARQ-ACK positions are determined for corresponding at most 5 candidate PDSCH reception occasions in slot 403 for each codebook, then 10 HARQ-ACK positions will be generated for slot 403 in the codebook. Considering only one PDSCH can be received when two PDSCHs of same or different services partially or totally overlapped in time domain, so that at most 5 PDSCHs for eMBB or URLLC can be received in the same DL slot 403, which means only 5 HARQ-ACK positions are valid, NACK will be filled to other 5 HARQ-ACK positions. Thus, 5-bits unnecessary UCI redundancy is generated.

Figure 5:
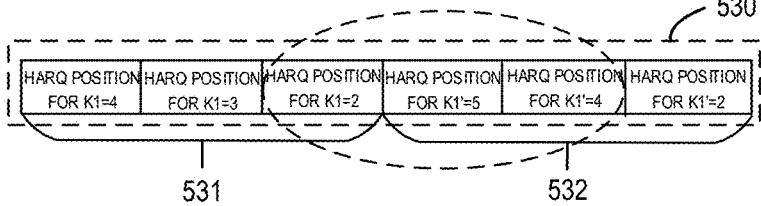
FIG. 5 illustrates a schematic diagram illustrating another example process for multiplexing HARQ codebooks with different priorities according to conventional solutions.

FIG. 5 illustrates a schematic diagram illustrating another example process 500 for multiplexing HARQ codebooks with different priorities according to conventional solutions. In this example, a UE is configured with two Type-1 HARQ-ACK codebooks for different services. One HARQ-ACK codebook with a lower priority is slot based codebook. The other HARQ-ACK codebook with a higher priority is sub-slot based codebook, and the sub-slot length is 7-symbol. HARQ-ACK timing value set K1 for the one HARQ-ACK codebook with the lower priority is {4, 3, 2}, and HARQ-ACK timing value set K1' for the other HARQ-ACK codebook with the higher priority is {5, 4, 2}.

As shown in FIG. 5, PUCCH 510 with the lower priority and PUCCH 520 with the higher priority are overlapped in the same slot 505. Based on K1, a HARQ-ACK window comprising slots 501, 502 and 503 is determined for PUCCH 510, and a HARQ-ACK codebook 531 is accordingly determined for PUCCH 510. Based on K1', a HARQ-ACK window comprising slots 503 and a portion of slot 504 is determined for PUCCH 520, and a HARQ-ACK codebook 532 is accordingly determined for PUCCH 520. According to conventional solutions, a single codebook 530 is constructed by stitching the HARQ-ACK codebooks 531 and 532 together.

It can be seen that both the HARQ-ACK codebooks 531 and 532 are repeated for the slot 503, and there are two same set of HARQ positions for the slot 503 (i.e., for slot HARQ-ACK timing K1=2, sub-slot HARQ-ACK timing K1'==4, and K1'=5) in the single codebook 530. Thus, unnecessary redundancy is also generated.

Example Implementation of Multiplexing Harq Feedbacks

Figure 6:
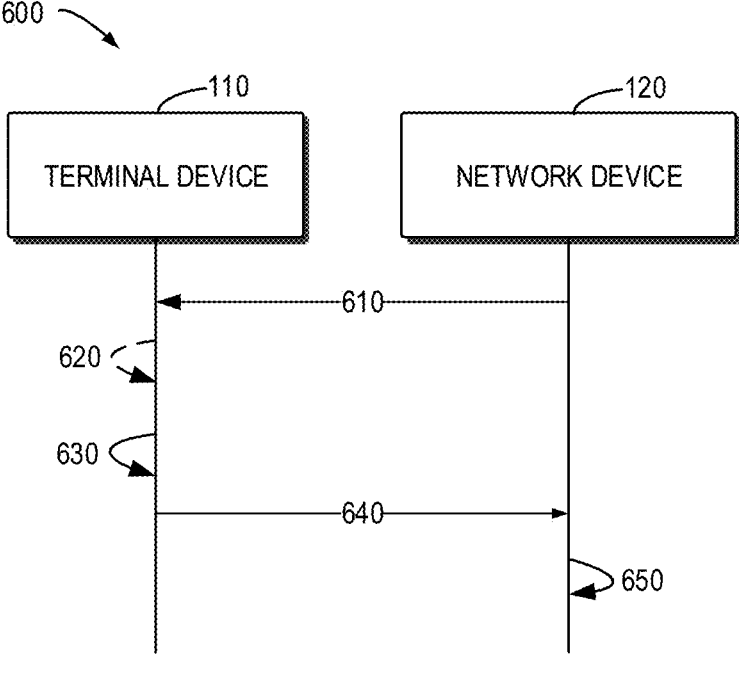
FIG. 6 illustrates a flow chart illustrating a process for communication upon multiplexing of HARQ feedbacks with different priorities according to embodiments of the present disclosure.

Embodiments of the present application provide improve solutions for multiplexing HARQ feedbacks in time domain so as to reduce the unnecessary redundancy. It will be described below with reference to FIGS. 6 to 10. FIG. 6 illustrates a schematic diagram illustrating a process 600 for communication upon multiplexing of HARQ feedbacks with different priorities according to embodiments of the present disclosure. For the purpose of discussion, the process 600 will be described with reference to FIG. 1. The process 600 may involve the terminal device 110 and the network device 120 as illustrated in FIG. 1.

As shown in FIG. 6, the network device 120 transmits 610, to the terminal device 110, a first timing value set associated with a first HARQ feedback with a first priority, a second timing value set associated with a second HARQ feedback with a second priority different from the first priority, and a TDRA list common for the first and second HARQ feedbacks. That is, the TDRA list is same for the first and second HARQ feedbacks. In some embodiments, the network device 120 may configure the first and second timing value sets for different services and the TDRA list for the terminal device 110 via a radio resource control (RRC) signaling. For example, the first and second timing value sets may be HARQ-ACK timing value sets.

In some embodiments, the first priority may be higher than the second priority. In some alternative embodiments, the first priority may be lower than the second priority.

In some embodiments, both codebook types configured for the first and second HARQ feedbacks may be Type-1 HARQ-ACK codebooks. Alternatively, both codebook types configured for the first and second HARQ feedbacks may be Type-2 HARQ-ACK codebooks. Of course, a codebook type configured for the first HARQ feedback and that configured for the second HARQ feedback may be different. The present disclosure does not make limitation for this.

Upon receipt of the first and second timing value sets and the TDRA list, the terminal device 110 can construct a HARQ codebook comprising the first and second HARQ feedbacks. In some embodiments, the terminal device 110 may determine 620 whether the first and second HARQ feedbacks are to be transmitted in the same uplink control channel (for example, a PUCCH). If determining that the first and second HARQ feedbacks are to be transmitted in the same PUCCH, the terminal device 110 constructs 630 a single HARQ codebook for the first and second HARQ feedbacks. Of course, this merely is an example, and any other suitable ways are also feasible to trigger the construction.

According to embodiments of the present disclosure, a third timing value set is derived from the first and second timing value sets, and the HARQ codebook is constructed at least based on the third timing value set and the TDRA list. With the third timing value set, a HARQ codebook having no overlapped HARQ positions for one slot can be constructed. For illustration, some example implementations for the construction will be described below with reference to Embodiments 1-4. For convenience, the first timing value set is denoted as $K1_{LP}$, the second timing value set is denoted as $K1_{HP}$, and the third timing value set is denoted as $K1_{new}$.

Embodiment 1

In this embodiment, both codebook types configured for the first and second HARQ feedbacks are Type-1 HARQ-ACK codebooks, both of the first and second HARQ feedbacks are slot based uplink control channel feedback. In this case, a granularity of values in the first and second timing value sets is a slot. In some embodiments, the terminal device 110 may determine the third timing value set $K1_{new}$ by doing a union of the first timing value set $K1_{LP}$ and the second timing value set $K1_{HP}$. That is, $K1_{new}$ can be represented by equation (1) below.

$$K1_{new}=K1_{LP} \cup K1_{HP} \tag{1}$$

Figure 7:
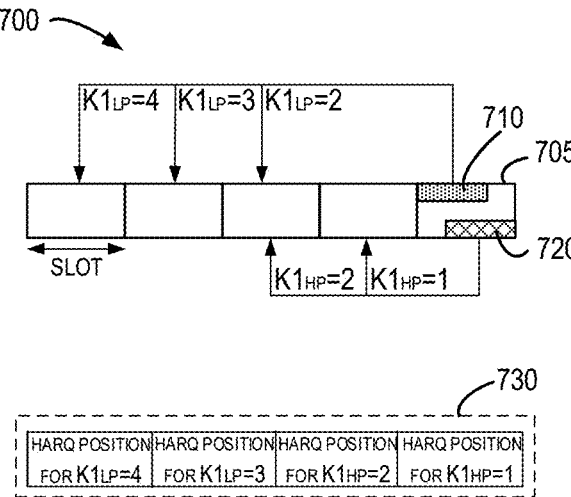
FIG. 7 illustrates a schematic diagram illustrating an example process for constructing a HARQ codebook for HARQ feedbacks according to embodiments of the present disclosure.

Then the terminal device 110 can construct the HARQ codebook at least based on the third timing value set $K1_{new}$ and the TDRA list. This will be detailed in connection with an example of FIG. 7. FIG. 7 illustrates a schematic diagram illustrating an example process 700 for constructing a HARQ codebook for HARQ feedbacks according to embodiments of the present disclosure. In this example, the first timing value set $K1_{LP}$ is {4, 3, 2}, and the second timing value set $K1_{HP}$ is {2, 1}.

As shown in FIG. 7, PUCCH 710 with the first priority and PUCCH 720 with the second priority are overlapped in the same slot 705. Based on the first and second timing value sets $K1_{LP}$ and $K1_{HP}$, the terminal device 110 obtains the third timing value set $K1_{new}$={4, 3, 2, 1}. In some embodiments, the terminal device 110 may determine a HARQ codebook 730 at least based on $K1_{new}$ and the TDRA list by a similar process as that described in FIG. 3A. Of course, any other suitable processes are also feasible to determine the HARQ codebook based on $K1_{new}$ and the TDRA list, and the present disclosure does not make limitation for this.

It can be seen that there is no overlapped HARQ positions for each slot in the HARQ codebook 730. Thus, unnecessary redundancy is reduced in a simply way. Further, this solution facilitates utilization of a joint coding.

In some embodiments, the terminal device 110 may find the HARQ position of a PDSCH in the HARQ codebook 730 and report the related HARQ-ACK bit for the PDSCH.

As a variation of Embodiment 1, both of the first and second HARQ feedbacks may be sub-slot based uplink control channel feedback, and a granularity of values in the first and second timing value sets may be a sub-slot. The implementation described in connection with FIG. 7 is also applied to the sub-slot case, and thus its details are not repeated here for concise.

Embodiment 2

In this embodiment, both codebook types configured for the first and second HARQ feedbacks are Type-1 HARQ-ACK codebooks, both of the first and second HARQ feedbacks are also slot based uplink control channel feedback. In this case, a granularity of values in the first and second timing value sets is also a slot. In some embodiments, the terminal device 110 may determine the third timing value set $K1_{new}$ by removing, from the first timing value set $K1_{LP}$, an intersection $K1_{\cap}$ of the first and second timing value sets $K1_{LP}$ and $K1_{HP}$. That is, $K1_{new}$ can be determined by equations (2) and (3) below.

$$K1_{\cap}=K1_{LP} \cap K1_{HP} \tag{2}$$

$$K1_{new}=K1_{LP}-K1_{\cap} \tag{3}$$

In some embodiments, the terminal device 110 may construct a first HARQ codebook at least based on the third timing value set $K1_{new}$ and the TDRA list by a similar process as that described in FIG. 3A. Of course, any other suitable processes are also feasible to determine the first HARQ codebook based on $K1_{new}$ and the TDRA list, and the present disclosure does not make limitation for this. In some embodiments, the terminal device 110 construct a second HARQ codebook at least based on the second timing value set $K1_{HP}$ and the TDRA list by the similar process as that described in FIG. 3A. Of course, any other suitable processes are also feasible to determine the second HARQ codebook based on $K1_{HP}$ and the TDRA list, and the present disclosure does not make limitation for this.

Upon determination of the first and second HARQ codebooks, the terminal device 110 may construct the HARQ codebook by appending one of the first and second HARQ codebooks to the other. In some embodiments, the appending may be performed according to priority. Of course, any other suitable ways are also feasible for implementing the appending. This will be detailed in connection with an example of FIG. 8.

Figure 8:
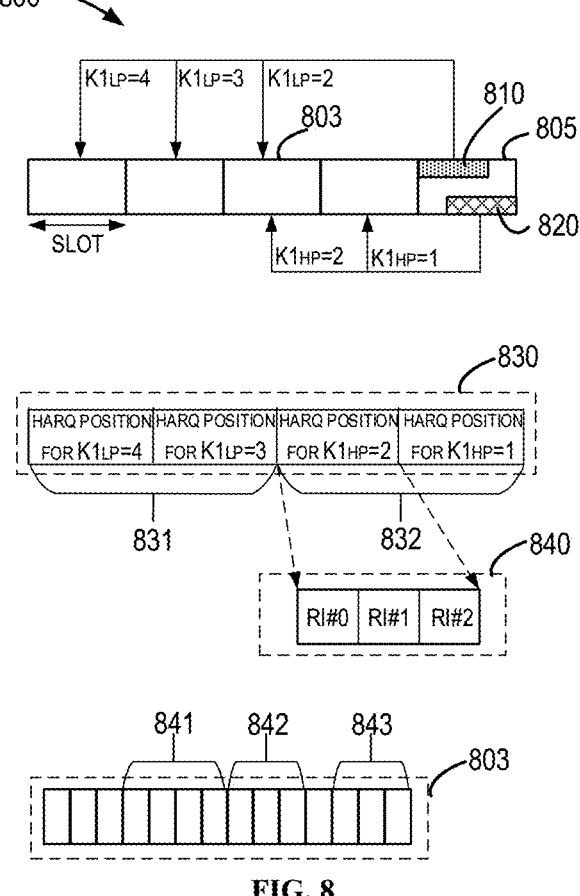
FIG. 8 illustrates a schematic diagram illustrating another example process for constructing a HARQ codebook for HARQ feedbacks according to embodiments of the present disclosure.

FIG. 8 illustrates a schematic diagram illustrating another example process 800 for constructing a HARQ codebook for HARQ feedbacks according to embodiments of the present disclosure. In this example, the first timing value set $K1_{LP}$ is {4, 3, 2}, and the second timing value set $K1_{HP}$ is {2, 1}.

As shown in FIG. 8, PUCCH 810 with the first priority and PUCCH 820 with the second priority are overlapped in the same slot 805. Based on the first and second timing value sets $K1_{LP}$ and $K1_{HP}$, the terminal device 110 may determine $K1 \cap = \{2\}$, and obtain the third timing value set $K1_{new} = \{4, 3\}$. In this example, the third timing value set may be considered as an updated first timing value set.

In some embodiments, the terminal device 110 may determine the first HARQ codebook 831 at least based on $K1_{new}$ and the TDRA list by a similar process as that described in FIG. 3A. Of course, any other suitable processes are also feasible to determine the first HARQ codebook based on $K1_{new}$ and the TDRA list, and the present disclosure does not make limitation for this. In some embodiments, the terminal device 110 may determine the second HARQ codebook 832 at least based on $K1_{HP}$ and the TDRA list by a similar process as that described in FIG. 3A. Of course, any other suitable processes are also feasible to determine the first HARQ codebook based on $K1_{HP}$ and the TDRA list, and the present disclosure does not make limitation for this. Then, the terminal device 110 may construct the HARQ codebook 830 by appending the second HARQ codebook 832 to the first HARQ codebook 831. Of course, the terminal device 110 may also construct another HARQ codebook by appending the first HARQ codebook 831 to the second HARQ codebook 832. The present disclosure does not make limitation for the appending manner.

UE reports the HARQ-ACK bit with first priority for PDSCH(s) in the overlapped slot in the HARQ-ACK codebook based on the start symbol and length (SLIV) of the PDSCH(s). The following description is made on how to report the HARQ-ACK bit with first priority for PDSCH associated with $K1_{LP}=2$. For example, the TDRA list is configured as shown in Table 3.

TABLE 3

An example of a TDRA list for PDSCH

| Row Index | Start | Length |
|-----------|-------|--------|
| 0 | #3 | 4 |
| 1 | #7 | 3 |
| 2 | #11 | 3 |

For convenience, the candidate PDSCH reception occasions in each slot are schematically shown in Table 4.

TABLE 4

An example of candidate PDSCH reception occasions

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| | | | RI#0 | RI#0 | RI#0 | RI#0 | | | | | | | |
| | | | | | | | RI#1 | RI#1 | RI#1 | | | | |
| | | | | | | | | | | | RI#2 | RI#2 | RI#2 | where 0-13 denote symbol number, and candidate PDSCH reception occasions correspond to RI #0 located in symbols 3-6, candidate PDSCH reception occasions correspond to RI #1 located in symbols 7-9, candidate PDSCH reception occasions correspond to RI #2 located in symbols 11-13.

In some embodiments, the terminal device 110 may find HARQ position of a PDSCH in the HARQ codebook 830 and report the related HARQ-ACK bit for the PDSCH. As to DL slot 803 associated with $K1_{HP}=2$, assuming that eMBB PDSCH #1 841 is scheduled with RI #0 in the DL slot 803, and URLLC PDSCH #1 842 and URLLC PDSCH #2 843 are scheduled with RI #1 and RI #2 in the DL slot 803. In this case, the terminal device 110 may report the HARQ-ACK bits for these PDSCHs in the DL slot 803 as shown by reference sign 840.

It can be seen that there is no overlapped HARQ positions for each slot in the HARQ codebook 830. Thus, unnecessary redundancy can be removed, and UCI overhead can be reduced. Further, a reliability of HARQ feedback for a service with a higher priority can be ensured. In addition, this solution can be applied for both separate coding and joint coding.

As a variation of Embodiment 2, both of the first and second HARQ feedbacks may be sub-slot based uplink control channel feedback, and a granularity of values in the first and second timing value sets may be a sub-slot. The implementation and effects described in connection with FIG. 8 is also applied to the sub-slot case, and thus its details are not repeated here for concise.

Embodiment 3

In this embodiment, both codebook types configured for the first and second HARQ feedbacks are Type-1 HARQ-ACK codebooks, the first HARQ feedback is slot based uplink control channel feedback, and the second HARQ feedback is sub-slot based uplink control channel feedback. In this case, a granularity of values in the first timing value set is a slot, and a granularity of values in the second timing value set is a sub-slot.

In some embodiments, the terminal device 110 may transform the first timing value set $K1_{LP}$ into a fourth timing value set (denoted as K1TR herein) based on a sub-slot length configuration, and determine the third timing value set $K1_{new}$ by doing a union of the fourth timing value set K1TR and the second timing value set K1HP. That is, $K1_{new}$ can be determined by equation (4) below.

$$K1_{new} = K1_{TR} \cap K1_{HP} \qquad (4)$$

Figure 9:
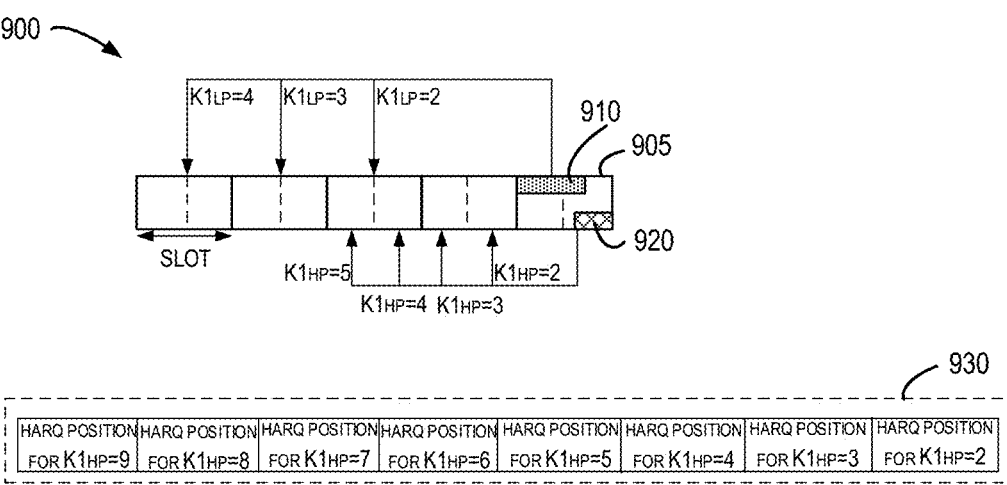
FIG. 9 illustrates a schematic diagram illustrating another example process for constructing a HARQ codebook for HARQ feedbacks according to embodiments of the present disclosure.

Then the terminal device 110 can construct the HARQ codebook at least based on the third timing value set $K1_{new}$ and the TDRA list. This will be detailed in connection with an example of FIG. 9. FIG. 9 illustrates a schematic diagram illustrating another example process 900 for constructing a HARQ codebook for HARQ feedbacks according to embodiments of the present disclosure. In this example, the first slot timing value set $K1_{LP}$ is {4, 3, 2}, and the second sub-slot timing value set $K1_{HP}$ is $\{5, 4, 3, 2\}$, the sub-slot length is 7-symbol, the slot length is 14 symbol.

As shown in FIG. 9, PUCCH 910 with the first priority and PUCCH 920 with the second priority are overlapped in the same slot 905. Assume that sub-slot PUCCH resource 20 is determined as the multiplexed PUCCH resource. Based on the first and second timing value sets $K1_{LP}$ and $K1_{HP}$, the terminal device 110 may determine the fourth timing value set $K1_{TR}=\{9, 8, 7, 6, 5, 4\}$, and obtain the third timing value set $K1_{new}=\{9, 8, 7, 6, 5, 4, 3, 2\}$. In some embodiments, the terminal device 110 may determine a HARQ codebook 930 at least based on $K1_{new}$ and the TDRA list by a similar process as that described in FIG. 3B. Of course, any other suitable processes are also feasible to determine the HARQ codebook based on $K1_{new}$ and the TDRA list, and the present disclosure does not make limitation for this.

It can be seen that there is no overlapped HARQ positions for each slot in the HARQ codebook 930. Thus, unnecessary redundancy is reduced. Further, this solution facilitates utilization of a joint coding.

In some embodiments, the terminal device 110 may find HARQ position of a PDSCH in the HARQ codebook 930 based on allocated SLIV of the PDSCH and report the related HARQ-ACK bits for the PDSCH.

Embodiment 4

In this embodiment, both codebook types configured for the first and second HARQ feedbacks are Type-1 HARQ-ACK codebooks, the first HARQ feedback is slot based uplink control channel feedback, and the second HARQ feedback is sub-slot based uplink control channel feedback. In this case, a granularity of values in the first timing value set is a slot, and a granularity of values in the second timing value set is a sub-slot.

In some embodiments, the terminal device 110 may determine a first HARQ feedback window based on the first timing value set $K1_{LP}$, and determine a second HARQ feedback window based on the second timing value set $K1_{HP}$. For example, the terminal device 110 may determine the first and second HARQ feedback windows by a similar process described in FIG. 3A. Upon determination of the first and second HARQ feedback windows, the terminal device 110 may determine a fifth timing value set (denoted as $K1_{OV}$ herein) associated with an overlapping portion of the first and second HARQ feedback windows, and determine the third timing value set $K1_{new}$ by removing the fifth timing value set $K1_{OV}$ from the first timing value set $K1_{LP}$. That is, $K1_{new}$ can be determined by equation (5) below.

$$K1_{new}=K1_{LP}-K1_{OV} \tag{5}$$

Then the terminal device 110 may construct a third HARQ codebook at least based on the second timing value set $K1_{HP}$ and the TDRA list by a similar process as that described in FIG. 3B. Of course, any other suitable processes are also feasible to determine the third HARQ codebook based on $K1_{HP}$ and the TDRA list, and the present disclosure does not make limitation for this. The terminal device 110 may construct a fourth HARQ codebook at least based on the third timing value set $K1_{new}$ and the TDRA list by a similar process as that described in FIG. 3A. Of course, any other suitable processes are also feasible to determine the fourth HARQ codebook based on $K1_{new}$ and the TDRA list, and the present disclosure does not make limitation for this.

In some embodiments, the terminal device 110 may determine a first HARQ feedback window based on the first timing value set $K1_{LP}$, and determine a second HARQ feedback window based on the second timing value set $K1_{HP}$. For example, the terminal device 110 may determine the first and second HARQ feedback windows by a similar process described in FIG. 3. Upon determination of the first and second HARQ feedback windows, the terminal device 110 may determine a fifth timing value set (denoted as $K1_{OV}$ herein) associated with an overlapping portion of the first and second HARQ feedback windows, and determine the third timing value set $K1_{new}$ by removing the fifth timing value set $K1_{OV}$ from the second timing value set $K1_{HP}$. That is, $K1_{new}$ can be determined by equation (6) below.

$$K1_{new}=K1_{HP}-K1OV \tag{6}$$

Then the terminal device 110 may construct a third HARQ codebook at least based on the second timing value set $K1_{LP}$ and the TDRA list by a similar process as that described in FIG. 3A. Of course, any other suitable processes are also feasible to determine the third HARQ codebook based on $K1_{LP}$ and the TDRA list, and the present disclosure does not make limitation for this. The terminal device 110 may construct a fourth HARQ codebook at least based on the third timing value set $K1_{new}$ and the TDRA list by a similar process as that described in FIG. 3B. Of course, any other suitable processes are also feasible to determine the fourth HARQ codebook based on $K1_{new}$ and the TDRA list, and the present disclosure does not make limitation for this.

Upon determination of the third and fourth HARQ codebooks, the terminal device 110 may construct the HARQ codebook by appending one of the third and fourth HARQ codebooks to the other. In some embodiments, the appending may be performed according to priority. Of course, the present disclosure also does not make any limitation for the appending manner, and any other suitable ways are also feasible for implementing the appending. This will be detailed in connection with an example of FIG. 10.

Figure 10:
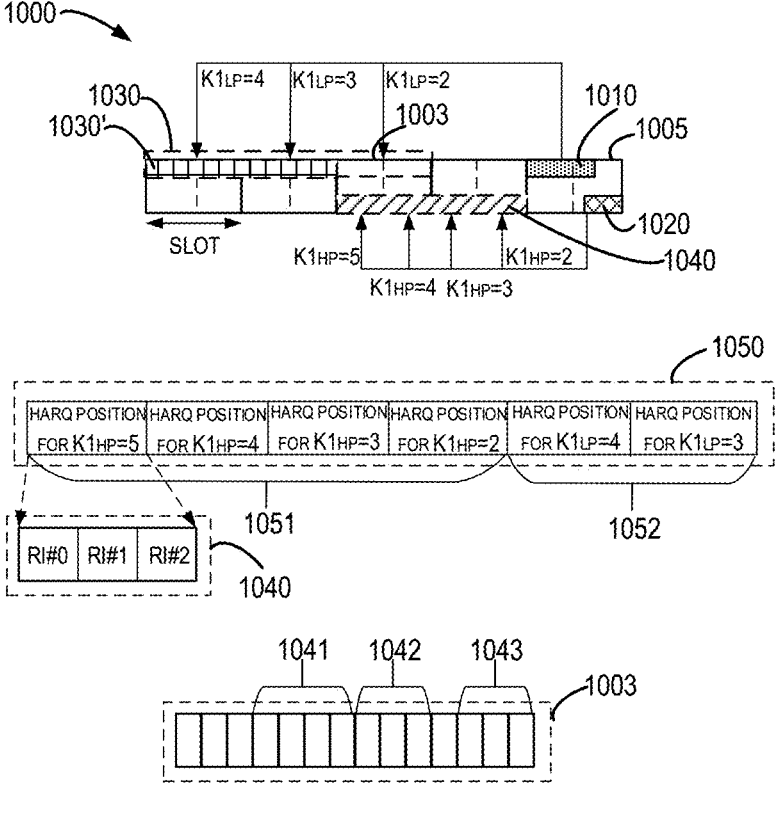
FIG. 10 illustrates a schematic diagram illustrating another example process for constructing a HARQ codebook for HARQ feedbacks according to embodiments of the present disclosure.

FIG. 10 illustrates a schematic diagram illustrating another example process 1000 for constructing a HARQ codebook for HARQ feedbacks according to embodiments of the present disclosure. In this example, the first timing value set $K1_{LP}$ is $\{4, 3, 2\}$, and the second timing value set $K1_{HP}$ is $\{5, 4, 3, 2\}$.

As shown in FIG. 10, PUCCH 1010 with the first priority and PUCCH 1020 with the second priority are overlapped in the same slot 1005. Based on the first timing value set $K1_{LP}$, the terminal device 110 may determine first HARQ feedback window 1030. Based on the second timing value set $K1_{HP}$, the terminal device 110 may determine second HARQ feedback window 1040. Accordingly, the terminal device 110 may determine the fifth timing value set $K1_{OV}$ based on the overlapping portion of the first and second HARQ feedback windows 1030 and 1040, and determine the third timing value set $K1_{new}$ by removing $K1_{OV}$ from $K1_{LP}$. Then, the third timing value set $K1_{new}$ corresponds to an updated HARQ feedback window 1030'.

In some embodiments, the terminal device 110 may determine third HARQ codebook 1051 at least based on $K1_{HP}$ and the TDRA list by a similar process as that described in FIG. 3B. Of course, any other suitable processes are also feasible to determine the first HARQ codebook based on $K1_{HP}$ and the TDRA list, and the present disclosure does not make limitation for this. In some embodiments, the terminal device 110 may determine fourth HARQ codebook 1052 at least based on $K1_{new}$ and the TDRA list by a similar process as that described in FIG. 3A. Of course, any other suitable processes are also feasible to determine the first HARQ codebook based on $K1_{new}$ and the TDRA list, and the present disclosure does not make limitation for this.

Upon determination of the third and fourth HARQ codebooks, the terminal device 110 may construct a HARQ codebook 1050 by appending the fourth HARQ codebook 1052 to the third HARQ codebook 1051. Alternatively, the terminal device 110 may construct another HARQ codebook by appending the third HARQ codebook 1051 to the fourth HARQ codebook 1052. The present disclosure does not make limitation for the appending manner.

The following description is made on how to report the slot based HARQ-ACK bits for corresponding PDSCH(s) associated with slot for $K1_{LP}=2$. For example, the TDRA list is configured as shown in the above Table 3, the candidate PDSCH reception occasions in each slot are schematically shown in the above Table 4.

In some embodiments, the terminal device 110 may find HARQ position of a PDSCH in the HARQ codebook 1050 and report the related HARQ-ACK bits for the PDSCH. As to DL slot 1003 associated with the overlapped HARQ feedback window (for $K1_{LP}=2$), assuming that eMBB PDSCH #1 1041 is scheduled with RI #0 in the DL slot 1003, and URLLC PDSCH #1 1042 and URLLC PDSCH #2 1043 are scheduled with RI #1 and RI #2 in the DL slot 1003. In this case, the terminal device 110 may transform slot HARQ-ACK timing value $K1_{LP}=2$ of eMBB into a sub-sot HARQ-ACK timing value $K1'=5$, and then find HARQ position of a eMBB PDSCH 1041 in the sub-slot HARQ codebook 1051 based on $K1'=5$ and SLIV of RI #0, and directly report the HARQ-ACK bit for the URLLC PDSCH #1 1042 and URLLC PDSCH #2 1043 in the sub-slot HARQ codebook 1051 based on $K1_{HP}=5$ and SLIV of RI #1 and RI #2, as shown by reference sign 1040.

It can be seen that there is no overlapped HARQ positions for each slot in the HARQ codebook 1050. Thus, unnecessary redundancy can be removed, and UCI overhead can be reduced. Further, a reliability of HARQ feedback for a service with a higher priority can be ensured. In addition, this solution can be applied for both separate coding and joint coding.

It is to be understood that the above examples in FIGS. 7-10 are merely for illustration, and do not make limitation for the present disclosure.

Return to FIG. 6, upon construction of the HARQ codebook for the HARQ feedbacks, the terminal device 110 transmits 640 the HARQ codebook to the network device 120. In some embodiments, the terminal device 110 may determine whether a separate coding or a joint coding is applied for the first and second HARQ feedbacks. Based on this determination, the terminal device 110 may transmit the HARQ codebook efficiently.

In some embodiments, the terminal device 110 may receive, from the network device 120, a RRC configuration indicating whether a separate coding or a joint coding is applied for the first and second HARQ feedbacks, and transmit the HARQ codebook based on the RRC configuration.

In some alternative embodiments, the terminal device 110 may receive, from the network device 120, downlink control information (DCI) indicating whether a separate coding or a joint coding is applied for the first and second HARQ feedbacks, and transmit the HARQ codebook based on the DCI.

In some alternative embodiments, the terminal device 110 may determine whether a separate coding or a joint coding is applied for the first and second HARQ feedbacks based on a predefined condition. In some embodiments, if determining that a first condition is satisfied, the terminal device 110 may transmit the HARQ codebook based on a separate coding, the first condition indicating that the separate coding scheme is applied for the first and second HARQ feedbacks. If determining that a second condition is satisfied, the terminal device 110 may transmit the HARQ codebook based on a joint coding, the second condition indicating that the joint coding scheme is applied for the first and second HARQ feedbacks.

In some embodiments, the first and second conditions may be based on the number of bits of the HARQ codebook. For example, if the number of bits of the HARQ codebook is smaller than a thread x, the joint coding is used. If the number of bits of the HARQ codebook is larger than or equal to a thread x, the separate coding is used.

In some scenarios, when DCI miss detection happens, it leads to different understanding on Type-2 HARQ-ACK codebook size between a network device and a terminal device. In some embodiments where a codebook type configured for the first HARQ feedback is Type-1 HARQ-ACK codebook and a codebook type configured for the second HARQ feedback is Type-2 HARQ-ACK codebook, the terminal device 110 may construct the HARQ codebook by constructing a fifth HARQ codebook associated with the first HARQ feedback, constructing a sixth HARQ codebook associated with the second HARQ feedback, and appending the sixth HARQ codebook to the fifth HARQ codebook. In other words, the HARQ codebook can be derived by placing the Type-2 HARQ-ACK codebook after the Type-1 HARQ-ACK codebook. In this way, the network device 120 is enabled to decode the Type-1 HARQ-ACK codebook successfully even if the DCI miss detection happens.

In some embodiments, the network device 120 may enable the multiplexing for HARQ codebooks of different priorities on an uplink control channel by a RRC parameter. For example, the terminal device 110 may receive, from the network device 120, a RRC configuration indicating whether a separate coding or a joint coding is applied for the first and second HARQ feedbacks. If the RRC configuration indicates that the joint coding is applied, the terminal device 110 may construct the HARQ codebook according to embodiments of the present disclosure described with reference to FIGS. 7-10. If the RRC configuration indicates that the separate coding is applied, and/or different TDRA lists configured for HARQ-ACK feedback of different priorities, the terminal device 110 may construct a further HARQ codebook by appending a HARQ codebook constructed for a HARQ feedback with a lower priority to a HARQ codebook constructed for a HARQ feedback with a higher priority. In other words, the further HARQ codebook is constructed by directly placing the HARQ codebook with the lower priority after the HARQ codebook with the higher priority.

With reference to FIG. 6, the network device 120 receives the HARQ codebook accordingly. In some embodiments where a joint coding is applied, the network device 120 may receive the HARQ codebook constructed based on the third timing value set, e.g., as described in connection with FIGS. 7-10. In some embodiments where a separate coding is applied, the network device 120 may receive the further HARQ codebook constructed by appending a first HARQ codebook constructed for the first HARQ feedback with the lower priority to a second HARQ codebook constructed for the second HARQ feedback with the higher priority.

Upon receipt of the HARQ codebook, the network device 120 determines 650 the first and second HARQ feedbacks from the HARQ codebook accordingly. In some embodiments, both of the first and second HARQ feedbacks are slot based uplink control channel feedbacks, and a granularity of values in the first and second timing value sets is a slot. In some embodiments, both of the first and second HARQ feedbacks are sub-slot based uplink control channel feedbacks, and a granularity of values in the first and second timing value sets is a sub-slot. In these embodiments, the network device 120 may determine the third timing value set by doing a union of the first timing value set and the second timing value set, and determine the first and second HARQ feedbacks from the HARQ codebook at least based on the third timing value set and the TDRA list.

Alternatively, the network device 120 may determine the third timing value set by removing, from the first timing value set, an intersection of the first and second timing value sets, determine the first HARQ feedback from the HARQ codebook at least based on the third timing value set and the TDRA list, and determine the second HARQ feedback from the HARQ codebook at least based on the second timing value set and the TDRA list.

In some embodiments, the first HARQ feedback is slot based uplink control channel feedback, and the second HARQ feedback is sub-slot based uplink control channel feedback. In this case, a granularity of values in the first second timing value set is a slot, and a granularity of values in the second timing value set is a sub-slot. In these embodiments, the network device120 may transform the first timing value set into a fourth timing value set based on a sub-slot length configuration, determine the third timing value set by doing a union of the fourth timing value set and the second timing value set, and determines the first and second HARQ feedbacks from the HARQ codebook at least based on the third timing value set and the TDRA list.

Alternatively, the network device 120 may determine a first HARQ feedback window based on the first timing value set, determine a second HARQ feedback window based on the second timing value set, determine a fifth timing value set associated with an overlapping portion of the first and second HARQ feedback windows, determine the third timing value set by removing the fifth timing value set from the first timing value set, determine the first HARQ feedback from the HARQ codebook at least based on the second timing value set and the TDRA list, and determine the second HARQ feedback from the HARQ codebook at least based on the third timing value set and the TDRA list.

Alternatively, the network device 120 may determine a first HARQ feedback window based on the first timing value set, determine a second HARQ feedback window based on the second timing value set, determine a fifth timing value set associated with an overlapping portion of the first and second HARQ feedback windows, determine the third timing value set by removing the fifth timing value set from the second timing value set, determine the first HARQ feedback from the HARQ codebook at least based on the first timing value set and the TDRA list, and determine the second HARQ feedback from the HARQ codebook at least based on the third timing value set and the TDRA list.

In some embodiments where a codebook type configured for the first HARQ feedback is Type-1 HARQ-ACK codebook and a codebook type configured for the second HARQ feedback is Type-2 HARQ-ACK codebook, the network device 120 may determine a size of the first HARQ feedback based on the first timing value set and the TDRA list, and determine the first and second HARQ feedbacks from the HARQ codebook based on the size. In this way, the network device 120 is still able to decode the Type-1 HARQ-ACK codebook successfully even if DCI miss detection occurs.

Example Implementation of Methods

Accordingly, embodiments of the present disclosure provide methods of communication implemented at a terminal device and a network device. These methods will be described below with reference to FIGS. 11 to 12.

FIG. 11 illustrates an example method 1100 of communication implemented at a terminal device in accordance with some embodiments of the present disclosure. For example, the method 1100 may be performed at the terminal device 110 as shown in FIG. 1. For the purpose of discussion, in the following, the method 1100 will be described with reference to FIG. 1. It is to be understood that the method 1100 may include additional blocks not shown and/or may omit some blocks as shown, and the scope of the present disclosure is not limited in this regard.

At block 1110, the terminal device 110 receives, from the network device 120, a first timing value set associated with a first HARQ feedback with a first priority, a second timing value set associated with a second HARQ feedback with a second priority different from the first priority, and a TDRA list common for the first and second HARQ feedbacks.

At block 1120, the terminal device 110 constructs a HARQ codebook comprising the first and second HARQ feedbacks at least based on a third timing value set and the TDRA list, the third timing value set being determined from the first and second timing value sets. In some embodiments, the terminal device 110 may receive, from the network device 120, a RRC configuration indicating whether a separate coding or a joint coding is applied for the first and second HARQ feedbacks. If the joint coding is applied, the terminal device 110 may construct the HARQ codebook. If the separate coding is applied, the terminal device 110 may construct a further HARQ codebook by appending a first HARQ codebook constructed for the first HARQ feedback with the first priority to a second HARQ codebook constructed for the second HARQ feedback with the second priority, the first priority being lower than the second priority, and transmit the further HARQ codebook to the network device 120 on the uplink control channel.

In some embodiments, both of the first and second HARQ feedbacks are slot based uplink control channel feedbacks, and a granularity of values in the first and second timing value sets is a slot. In some embodiments, both of the first and second HARQ feedbacks are sub-slot based uplink control channel feedbacks, and a granularity of values in the first and second timing value sets is a sub-slot. In these embodiments, the terminal device 110 may determine the third timing value set by doing a union of the first timing value set and the second timing value set; and construct the HARQ codebook at least based on the third timing value set and the TDRA list.

Alternatively, the terminal device 110 may determine the third timing value set by removing, from the first timing value set, an intersection of the first and second timing value sets; construct a first HARQ codebook at least based on the third timing value set and the TDRA list; construct a second HARQ codebook at least based on the second timing value set and the TDRA list; and construct the HARQ codebook by appending one of the first and second HARQ codebooks to the other.

In some embodiments, the first HARQ feedback is slot based uplink control channel feedback, and the second HARQ feedback is sub-slot based uplink control channel feedback, and a granularity of values in the first timing value set is a slot, and a granularity of values in the second timing value set is a sub-slot. In these embodiments, the terminal device 110 may transform the first timing value set into a fourth timing value set based on a sub-slot length configuration; determine the third timing value set by doing a union of the fourth timing value set and the second timing value set; and construct the HARQ codebook at least based on the third timing value set and the TDRA list.

Alternatively, the terminal device 110 may determine a first HARQ feedback window based on the first timing value set; determine a second HARQ feedback window based on the second timing value set; determine a fifth timing value set associated with an overlapping portion of the first and second HARQ feedback windows; determine the third timing value set by removing the fifth timing value set from the first timing value set; construct a third HARQ codebook at least based on the second timing value set and the TDRA list; construct a fourth HARQ codebook at least based on the third timing value set and the TDRA list; and construct the HARQ codebook by appending one of the third and fourth HARQ codebooks to the other.

Alternatively, the terminal device 110 may determine a first HARQ feedback window based on the first timing value set; determine a second HARQ feedback window based on the second timing value set; determine a fifth timing value set associated with an overlapping portion of the first and second HARQ feedback windows; determine the third timing value set by removing the fifth timing value set from the second timing value set; construct a third HARQ codebook at least based on the first timing value set and the TDRA list; construct a fourth HARQ codebook at least based on the third timing value set and the TDRA list; and construct the HARQ codebook by appending one of the third and fourth HARQ codebooks to the other.

In some embodiments where a codebook type configured for the first HARQ feedback is Type-1 HARQ-ACK codebook and a codebook type configured for the second HARQ feedback is Type-2 HARQ-ACK codebook, the terminal device 110 may construct a fifth HARQ codebook associated with the first HARQ feedback; construct a sixth HARQ codebook associated with the second HARQ feedback; and construct the HARQ codebook by appending the sixth HARQ codebook to the fifth HARQ codebook.

At block 1130, the terminal device 110 may transmit the HARQ codebook to the network device 120 on an uplink control channel. In some embodiments, the terminal device 110 may receive, from the network device 120, a RRC configuration indicating whether a separate coding or a joint coding is applied for the first and second HARQ feedbacks; and transmit the HARQ codebook based on the RRC configuration.

In some alternative embodiments, the terminal device 110 may receive, from the network device 120, DCI indicating whether a separate coding or a joint coding is applied for the first and second HARQ feedbacks; and transmit the HARQ codebook based on the DCI.

In some alternative embodiments, the terminal device 110 may perform the transmission of the HARQ codebook based on a predefined condition. In some embodiments, if determining that a first condition is satisfied, the terminal device 110 may transmit the HARQ codebook based on a separate coding, the first condition indicating that the separate coding scheme is applied for the first and second HARQ feedbacks. In some embodiments, if determining that a second condition is satisfied, the terminal device 110 may transmit the HARQ codebook based on a joint coding, the second condition indicating that the joint coding scheme is applied for the first and second HARQ feedbacks.

In this way, unnecessary redundancy can be reduced in case of multiplexing HARQ feedbacks on an uplink control channel, and UCI overhead can be reduced.

FIG. 12 illustrates an example method 1200 of communication implemented at a network device in accordance with some embodiments of the present disclosure. For example, the method 1200 may be performed at the network device 120 as shown in FIG. 1. For the purpose of discussion, in the following, the method 1200 will be described with reference to FIG. 1. It is to be understood that the method 1200 may include additional blocks not shown and/or may omit some blocks as shown, and the scope of the present disclosure is not limited in this regard.

As shown in FIG. 12, at block 1210, the network device 120 transmits, to the terminal device 110, a first timing value set associated with a first HARQ feedback with a first priority, a second timing value set associated with a second HARQ feedback with a second priority different from the first priority, and a TDRA list common for the first and second HARQ feedbacks. In some embodiments, the network device 120 may also transmit, to the terminal device 110, a RRC configuration indicating whether a separate coding or a joint coding is applied for the first and second HARQ feedbacks. In some embodiments, the network device 120 may transmit, to the terminal device 110, DCI indicating whether a separate coding or a joint coding is applied for the first and second HARQ feedbacks.

At block 1220, the network device 120 receives, from the terminal device 110, a HARQ codebook comprising the first and second HARQ feedbacks, the HARQ codebook being constructed at least based on a third timing value set and the TDRA list, the third timing value set being determined from the first and second timing value sets. In some embodiments, in accordance with a determination that a joint coding is applied, the network device 120 may receive the HARQ codebook. In some embodiments, in accordance with a determination that a separate coding is applied, the network device 120 may receive a further HARQ codebook constructed by appending a first HARQ codebook constructed for the first HARQ feedback with the first priority to a second HARQ codebook constructed for the second HARQ feedback with the second priority, the first priority being lower than the second priority.

At block 1230, the network device 120 determines the first and second HARQ feedbacks from the HARQ codebook. In some embodiments, both of the first and second HARQ feedbacks are slot based uplink control channel feedbacks, and a granularity of values in the first and second timing value sets is a slot. In some embodiments, both of the first and second HARQ feedbacks are sub-slot based uplink control channel feedbacks, and a granularity of values in the first and second timing value sets is a sub-slot. In these embodiments, the network device 120 may determine the third timing value set by doing a union of the first timing value set and the second timing value set; and determine the first and second HARQ feedbacks from the HARQ codebook at least based on the third timing value set and the TDRA list.

Alternatively, the network device 120 may determine the third timing value set by removing, from the first timing value set, an intersection of the first and second timing value sets; determine the first HARQ feedback from the HARQ codebook at least based on the third timing value set and the TDRA list; and determine the second HARQ feedback from the HARQ codebook at least based on the second timing value set and the TDRA list.

In some embodiments, the first HARQ feedback is slot based uplink control channel feedback, and the second HARQ feedback is sub-slot based uplink control channel feedback, and a granularity of values in the first second timing value set is a slot, and a granularity of values in the second timing value set is a sub-slot. In these embodiments, the network device 120 may transform the first timing value set into a fourth timing value set based on a sub-slot length configuration; determine the third timing value set by doing a union of the fourth timing value set and the second timing value set; and determine the first and second HARQ feedbacks from the HARQ codebook at least based on the third timing value set and the TDRA list.

Alternatively, the network device 120 may determine a first HARQ feedback window based on the first timing value set; determine a second HARQ feedback window based on the second timing value set; determine a fifth timing value set associated with an overlapping portion of the first and second HARQ feedback windows; determine the third timing value set by removing the fifth timing value set from the first timing value set; determine the first HARQ feedback from the HARQ codebook at least based on the second timing value set and the TDRA list; and determine the second HARQ feedback from the HARQ codebook at least based on the third timing value set and the TDRA list.

Alternatively, the network device 120 may determine a first HARQ feedback window based on the first timing value set; determine a second HARQ feedback window based on the second timing value set; determine a fifth timing value set associated with an overlapping portion of the first and second HARQ feedback windows; determine the third timing value set by removing the fifth timing value set from the second timing value set; determine the first HARQ feedback from the HARQ codebook at least based on the first timing value set and the TDRA list; and determine the second HARQ feedback from the HARQ codebook at least based on the third timing value set and the TDRA list.

In some embodiments where a codebook type configured for the first HARQ feedback is Type-1 HARQ-ACK codebook and a codebook type configured for the second HARQ feedback is Type-2 HARQ-ACK codebook, the network device 120 may determine a size of the first HARQ feedback based on the first timing value set and the TDRA list; and determine the first and second HARQ feedbacks from the HARQ codebook based on the size. In this way, the network device 120 is enabled to decode the Type-1 HARQ-ACK codebook successfully even if the DCI miss detection happens.

Example Implementation of Device

FIG. 13 is a simplified block diagram of a device 1300 that is suitable for implementing embodiments of the present disclosure. The device 1300 can be considered as a further example implementation of the terminal device 110 or the network device 120 as shown in FIG. 1. Accordingly, the device 1300 can be implemented at or as at least a part of the terminal device 110 or the network device 120.

As shown, the device 1300 includes a processor 1310, a memory 1320 coupled to the processor 1310, a suitable transmitter (TX) and receiver (RX) 1340 coupled to the processor 1210, and a communication interface coupled to the TX/RX 1340. The memory 1310 stores at least a part of a program 1330. The TX/RX 1340 is for bidirectional communications. The TX/RX 1340 has at least one antenna to facilitate communication, though in practice an Access Node mentioned in this application may have several ones. The communication interface may represent any interface that is necessary for communication with other network elements, such as X2/Xn interface for bidirectional communications between eNBs/gNBs, S1/NG interface for communication between a Mobility Management Entity (MME)/Access and Mobility Management Function (AMF)/SGW/UPF and the eNB/gNB, Un interface for communication between the eNB/gNB and a relay node (RN), or Uu interface for communication between the eNB/gNB and a terminal device.

The program 1330 is assumed to include program instructions that, when executed by the associated processor 1310, enable the device 1300 to operate in accordance with the embodiments of the present disclosure, as discussed herein with reference to FIGS. 6 to 12. The embodiments herein may be implemented by computer software executable by the processor 1310 of the device 1300, or by hardware, or by a combination of software and hardware. The processor 1310 may be configured to implement various embodiments of the present disclosure. Furthermore, a combination of the processor 1310 and memory 1320 may form processing means 1350 adapted to implement various embodiments of the present disclosure.

The memory 1320 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1320 is shown in the device 1300, there may be several physically distinct memory modules in the device 1300. The processor 1310 may be of any type suitable to the local technical network, and may include one or more of general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

In some embodiments, a terminal device comprises circuitry configured to: receiving, from a network device, a first timing value set associated with a first HARQ feedback with a first priority, a second timing value set associated with a second HARQ feedback with a second priority different from the first priority, and a TDRA list common for a first HARQ feedback and a second HARQ feedback; constructing a HARQ codebook comprising the first and second HARQ feedbacks at least based on a third timing value set and the TDRA list, the third timing value set being determined from the first and second timing value sets; and transmitting the HARQ codebook to a network device on an uplink control channel.

In some embodiments, both of the first and second HARQ feedbacks are slot based uplink control channel feedbacks, and a granularity of values in the first and second timing value sets is a slot. In some embodiments, both of the first and second HARQ feedbacks are sub-slot based uplink control channel feedbacks, and a granularity of values in the first and second timing value sets is a sub-slot. In these embodiments, the circuitry may be configured to construct the HARQ codebook by determining the third timing value set by doing a union of the first timing value set and the second timing value set; and constructing the HARQ codebook at least based on the third timing value set and the TDRA list.

Alternatively, the circuitry may be configured to construct the HARQ codebook by determining the third timing value set by removing, from the first timing value set, an intersection of the first and second timing value sets; constructing a first HARQ codebook at least based on the third timing value set and the TDRA list; constructing a second HARQ codebook at least based on the second timing value set and the TDRA list; and constructing the HARQ codebook by appending one of the first and second HARQ codebooks to the other.

In some embodiments, the first HARQ feedback is slot based uplink control channel feedback, and the second HARQ feedback is sub-slot based uplink control channel feedback, and a granularity of values in the first timing value set is a slot, and a granularity of values in the second timing value set is a sub-slot. In these embodiments, the circuitry may be configured to construct the HARQ codebook by transforming the first timing value set into a fourth timing value set based on a sub-slot length configuration; determining the third timing value set by doing a union of the fourth timing value set and the second timing value set; and constructing the HARQ codebook at least based on the third timing value set and the TDRA list.

Alternatively, the circuitry may be configured to construct the HARQ codebook by determining a first HARQ feedback window based on the first timing value set; determining a second HARQ feedback window based on the second timing value set; determining a fifth timing value set associated with an overlapping portion of the first and second HARQ feedback windows; determining the third timing value set by removing the fifth timing value set from the first timing value set; constructing a third HARQ codebook at least based on the second timing value set and the TDRA list; constructing a fourth HARQ codebook at least based on the third timing value set and the TDRA list; and constructing the HARQ codebook by appending one of the third and fourth HARQ codebooks to the other.

Alternatively, the circuitry may be configured to construct the HARQ codebook by determining a first HARQ feedback window based on the first timing value set; determining a second HARQ feedback window based on the second timing value set; determining a fifth timing value set associated with an overlapping portion of the first and second HARQ feedback windows; determining the third timing value set by removing the fifth timing value set from the second timing value set; constructing a third HARQ codebook at least based on the first timing value set and the TDRA list; constructing a fourth HARQ codebook at least based on the third timing value set and the TDRA list; and constructing the HARQ codebook by appending one of the third and fourth HARQ codebooks to the other.

In some embodiments, the circuitry may be configured to transmit the HARQ codebook by receiving, from the network device, a RRC configuration indicating whether a separate coding or a joint coding is applied for the first and second HARQ feedbacks; and transmitting the HARQ codebook based on the RRC configuration. In some embodiments, the circuitry may be configured to transmit the HARQ codebook by receiving, from the network device, DCI indicating whether a separate coding or a joint coding is applied for the first and second HARQ feedbacks; and transmitting the HARQ codebook based on the DCI. In some embodiments, the circuitry may be configured to: in accordance with a determination that a first condition is satisfied, transmit the HARQ codebook based on a separate coding, the first condition indicating that the separate coding scheme is applied for the first and second HARQ feedbacks; and in accordance with a determination that a second condition is satisfied, transmit the HARQ codebook based on a joint coding, the second condition indicating that the joint coding scheme is applied for the first and second HARQ feedbacks.

In some embodiments, a codebook type configured for the first HARQ feedback is Type-1 HARQ-ACK codebook and a codebook type configured for the second HARQ feedback is Type-2 HARQ-ACK codebook. In these embodiments, the circuitry may be configured to construct the HARQ codebook by constructing a fifth HARQ codebook associated with the first HARQ feedback; constructing a sixth HARQ codebook associated with the second HARQ feedback; and constructing the HARQ codebook by appending the sixth HARQ codebook to the fifth HARQ codebook.

In some embodiments, the circuitry may be configured to construct the HARQ codebook by receiving, from the network device, a RRC configuration indicating whether a separate coding or a joint coding is applied for the first and second HARQ feedbacks; and in accordance with a determination that the joint coding is applied, constructing the HARQ codebook. In some embodiments, the circuitry may be further configured to: in accordance with a determination that the separate coding is applied, construct a further HARQ codebook by appending a first HARQ codebook constructed for the first HARQ feedback with the first priority to a second HARQ codebook constructed for the second HARQ feedback with the second priority, the first priority being lower than the second priority, and transmit the further HARQ codebook to the network device on the uplink control channel.

In some embodiments, a network device comprises circuitry configured to: transmit, at a network device and to a terminal device, a first timing value set associated with a first HARQ feedback with a first priority, a second timing value set associated with a second HARQ feedback with a second priority different from the first priority, and a TDRA list common for the first and second HARQ feedbacks; receive, from the terminal device, a HARQ codebook comprising the first and second HARQ feedbacks, the HARQ codebook being constructed at least based on a third timing value set and the TDRA list, the third timing value set being determined from the first and second timing value sets; and determine the first and second HARQ feedbacks from the HARQ codebook.

In some embodiments, both of the first and second HARQ feedbacks are slot based uplink control channel feedbacks, and a granularity of values in the first and second timing value sets is a slot. In some embodiments, both of the first and second HARQ feedbacks are sub-slot based uplink control channel feedbacks, and a granularity of values in the first and second timing value sets is a sub-slot. In these embodiments, the circuitry may be configured to determine the first and second HARQ feedbacks by determining the third timing value set by doing a union of the first timing value set and the second timing value set; and determining the first and second HARQ feedbacks from the HARQ codebook at least based on the third timing value set and the TDRA list.

Alternatively, the circuitry may be configured to determine the first and second HARQ feedbacks by determining the third timing value set by removing, from the first timing value set, an intersection of the first and second timing value sets; determining the first HARQ feedback from the HARQ codebook at least based on the third timing value set and the TDRA list; and determining the second HARQ feedback from the HARQ codebook at least based on the second timing value set and the TDRA list.

In some embodiments, the first HARQ feedback is slot based uplink control channel feedback, and the second HARQ feedback is sub-slot based uplink control channel feedback, and a granularity of values in the first second timing value set is a slot, and a granularity of values in the second timing value set is a sub-slot. In these embodiments, the circuitry may be configured to determine the first and second HARQ feedbacks by transforming the first timing value set into a fourth timing value set based on a sub-slot length configuration; determining the third timing value set by doing a union of the fourth timing value set and the second timing value set; and determining the first and second HARQ feedbacks from the HARQ codebook at least based on the third timing value set and the TDRA list.

Alternatively, the circuitry may be configured to determine the first and second HARQ feedbacks by determining a first HARQ feedback window based on the first timing value set; determining a second HARQ feedback window based on the second timing value set; determining a fifth timing value set associated with an overlapping portion of the first and second HARQ feedback windows; determining the third timing value set by removing the fifth timing value set from the first timing value set; determining the first HARQ feedback from the HARQ codebook at least based on the second timing value set and the TDRA list; and determining the second HARQ feedback from the HARQ codebook at least based on the third timing value set and the TDRA list.

Alternatively, the circuitry may be configured to determine the first and second HARQ feedbacks by determining a first HARQ feedback window based on the first timing value set; determining a second HARQ feedback window based on the second timing value set; determining a fifth timing value set associated with an overlapping portion of the first and second HARQ feedback windows; determining the third timing value set by removing the fifth timing value set from the second timing value set; determining the first HARQ feedback from the HARQ codebook at least based on the first timing value set and the TDRA list; and determining the second HARQ feedback from the HARQ codebook at least based on the third timing value set and the TDRA list.

In some embodiments, the circuitry may be further configured to transmit, to the terminal device, a RRC configuration indicating whether a separate coding or a joint coding is applied for the first and second HARQ feedbacks. In some embodiments, the circuitry may be further configured to transmit, to the terminal device, DCI indicating whether a separate coding or a joint coding is applied for the first and second HARQ feedbacks.

In some embodiments where a codebook type configured for the first HARQ feedback is Type-1 HARQ-ACK codebook and a codebook type configured for the second HARQ feedback is Type-2 HARQ-ACK codebook, the circuitry may be further configured to determine the first and second HARQ feedbacks by determining a size of the first HARQ feedback based on the first timing value set and the TDRA list; and determining the first and second HARQ feedbacks from the HARQ codebook based on the size.

In some embodiments, the circuitry may be configured to receive the HARQ codebook by in accordance with a determination that a joint coding is applied, receiving the HARQ codebook. In some embodiments, the circuitry may be further configured to: in accordance with a determination that a separate coding is applied, receive a further HARQ codebook constructed by appending a first HARQ codebook constructed for the first HARQ feedback with the first priority to a second HARQ codebook constructed for the second HARQ feedback with the second priority, the first priority being lower than the second priority.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory (ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 6 to 12. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of communication performed by a terminal device, the method comprising:
   receiving, from a network device, a first radio resource control (RRC) configuration indicating:
   a first set of timing values applied for a first service associated with a first hybrid automatic repeat request acknowledgement (HARQ-ACK) information,
   a second set of timing values applied for a second service associated with a second HARQ-ACK information, and
   at least one time domain resource allocation list;
   determining a HARQ-ACK codebook based on the first set of timing values, the second set of timing values and the at least one time domain resource allocation list; and
   transmitting, to the network device, the HARQ-ACK codebook,
   wherein the determining the HARQ-ACK codebook comprises:

determining a fourth set of timing values by performing an intersection of the first set of timing values and the second set of timing values,
   determining a fifth set of timing values by removing the fourth set of timing values from the first set of timing values,
   obtaining a first sub-codebook based on the fifth set of timing values and the at least one time domain resource allocation list, and
   determining the HARQ-ACK codebook based on the first sub-codebook.

2. The method of claim 1, wherein determining the HARQ-ACK codebook comprises:
   determining a third set of timing values by performing a union of the first set of timing values and the second set of timing values; and
   determining the HARQ-ACK codebook based on the third set of timing values and the at least one time domain resource allocation list.

3. The method of claim 2, further comprising receiving, from the network device, a second RRC configuration indicating a joint coding is applied to the HARQ-ACK codebook.

4. The method of claim 1, wherein the determining the HARQ-ACK codebook further comprises:
   obtaining a second sub-codebook based on the second set of timing values and the at least one time domain resource allocation list; and
   determining the HARQ-ACK codebook by concatenating the first sub-codebook to the second sub-codebook.

5. The method of claim 1, further comprising receiving, from the network device, a second RRC configuration indicating a separate coding is applied to the HARQ-ACK codebook.

6. The method of claim 1, wherein the second service is a multicast service.

7. The method of claim 1, further comprising:
   receiving, from the network device, a second RRC configuration indicating whether a separate coding or a joint coding is applied to the HARQ-ACK codebook;
   wherein determining the HARQ-ACK codebook further comprises determining the HARQ-ACK codebook based on the second RRC configuration.

8. A method of communication performed by a network device, the method comprising:
   transmitting to a terminal device:
   a first radio resource control (RRC) configuration indicating a first set of timing values applied for a first service associated with a first hybrid automatic repeat request acknowledgement (HARQ-ACK) information,
   a second set of timing values applied for a second service associated with a second HARQ-ACK information, and
   at least one time domain resource allocation list; and
   receiving, from the terminal device, a HARQ-ACK codebook determined based on the first set of timing values, the second set of timing values and the at least one time domain resource allocation list, wherein a fourth set of timing values is determined by performing an intersection of the first set of timing values and the second set of timing values, a fifth set of timing values is determined by removing the fourth set of timing values from the first set of timing values, a first sub-codebook is obtained based on the fifth set of timing values and the at least one time domain resource allocation list, and the HARQ-ACK codebook is determined based on the first sub-codebook.

9. The method of claim 8, wherein a third set of timing values is determined by performing a union of the first set of timing values and the second set of timing values, and the HARQ-ACK codebook is determined based on the third set of timing values and the at least one time domain resource allocation list.

10. The method of claim 9, further comprising transmitting, to the terminal device, a second RRC configuration indicating a joint coding is applied to the HARQ-ACK codebook.

11. The method of claim 8, wherein a second sub-codebook is obtained based on the second set of timing values and the at least one time domain resource allocation list, and the HARQ-ACK codebook is determined by concatenating the first sub-codebook to the second sub-codebook.

12. The method of claim 8, further comprising:
transmitting, to the terminal device, a second RRC configuration indicating that a separate coding is applied to the HARQ-ACK codebook.

13. The method of claim 8, wherein the second service is a multicast service.

14. The method of claim 8, further comprising transmitting, to the terminal device, a second RRC configuration indicating whether a separate coding or a joint coding is applied to the HARQ-ACK codebook, wherein the HARQ-ACK codebook is further determined based on the second RRC configuration.

15. A terminal device comprising a processor configured to cause the terminal device to:

receive, from a network device, a first radio resource control (RRC) configuration indicating:
a first set of timing values applied for a first service associated with a first hybrid automatic repeat request acknowledgement (HARQ-ACK) information,
a second set of timing values applied for a second service associated with a second HARQ-ACK information, and
at least one time domain resource allocation list;
determine a HARQ-ACK codebook based on the first set of timing values, the second set of timing values and the at least one time domain resource allocation list; and
transmit, to the network device, the HARQ-ACK codebook,
wherein the processor is further configured to cause the terminal device to determine the HARQ-ACK codebook by:
determining a fourth set of timing values by performing an intersection of the first set of timing values and the second set of timing values,
determining a fifth set of timing values by removing the fourth set of timing values from the first set of timing values,
obtaining a first sub-codebook based on the fifth set of timing values and the at least one time domain resource allocation list, and
determining the HARQ-ACK codebook based on the first sub-codebook.

* * * * *